Figure 2:
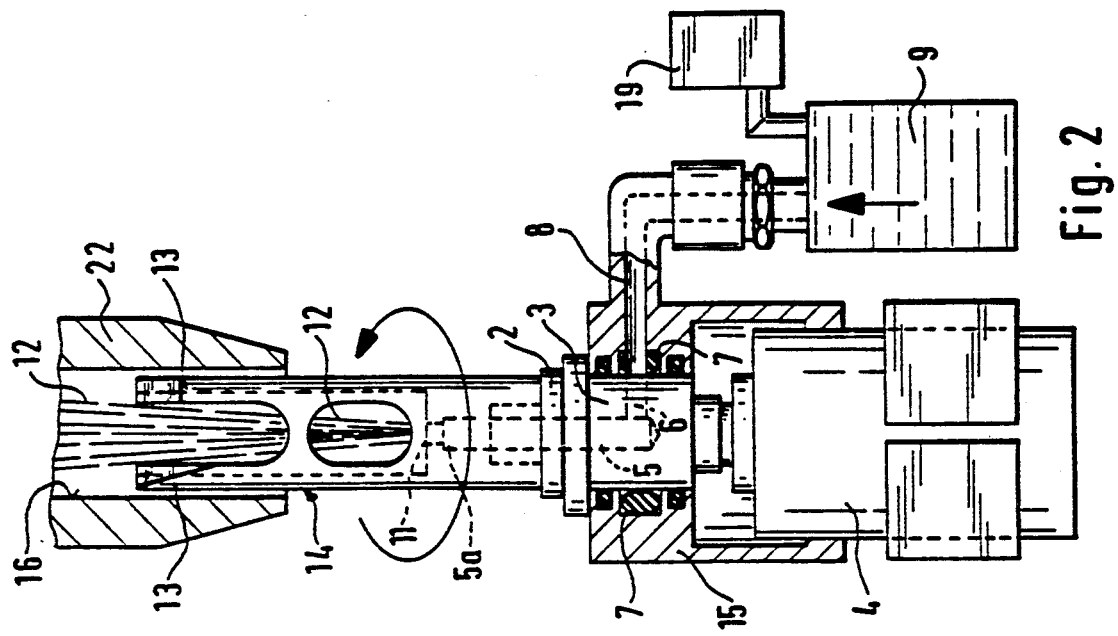

United States Patent [19]

Thielmann

[11] Patent Number: 5,138,969
[45] Date of Patent: Aug. 18, 1992

[54] DEVICE FOR CLEANING THE GAS NOZZLE OF A WELDING TORCH

[76] Inventor: Friedelin Thielmann, Fliederstrasse 9, D-6342 Haiger 9/OT Rodenbach, Fed. Rep. of Germany

[21] Appl. No.: 636,113

[22] Filed: Dec. 31, 1990

[30] Foreign Application Priority Data

Nov. 27, 1990 [DE] Fed. Rep. of Germany ....... 9016112

[51] Int. Cl.$^5$ ............................................. B05C 11/00
[52] U.S. Cl. ................................... 118/72; 118/302; 118/317; 219/137.2
[58] Field of Search ................. 118/72, DIG. 10, 302, 118/317; 228/57; 219/137.2

[56] References Cited

U.S. PATENT DOCUMENTS 4,702,195 10/1987 Thielmann ............................ 118/72

FOREIGN PATENT DOCUMENTS 0211505 7/1984 Fed. Rep. of Germany ... 219/137.2

Primary Examiner—W. Gary Jones
Assistant Examiner—Brenda Lamb
Attorney, Agent, or Firm—Edmund M. Jaskiewicz

[57] ABSTRACT

A device for cleaning the gas nozzle of a welding torch in which weld splatters have accumulated has a rotatable cutter which is axially movable into and out of a gas nozzle and the cutter is provided with a nozzle and passages for spraying an anti-adhesive agent into the gas nozzle either while the cutter is scraping or as the cutter is being withdrawn from the gas nozzle.

6 Claims, 1 Drawing Sheet

DEVICE FOR CLEANING THE GAS NOZZLE OF A WELDING TORCH

The present invention relates to a device for cleaning the gas nozzle of a welding torch, more particularly, to such a cleaning device having a cutter and nozzle means on the cutter for spraying an antiadhesive into the interior of the gas nozzle.

In such cleaning devices as known in the prior art, namely U.S. Pat. Nos. 4,702,194 and 4,834,280, both issued to applicant, a motor-driven, rotating cutter is introduced into the nozzle so that its blades scrape the inner wall of the nozzle free of weld splatter or residues of welding material. Then, the cutter is again retracted, and an anti-adhesive or a nonsticking agent is sprayed in the nozzle. The nonsticking agent prevents the nozzle from being clogged again too quickly in renewed use. The purpose of this cleaning device is, on the one hand, to perform the cleaning process in a short time, and, on the other hand, to increase the period between two nozzle cleanings. This especially has an effect as a time-saver with robotic welding, since a multiplicity of weld points or weld seams is provided in continuous operation in such a welding.

It is therefore the principal object of the present invention to provide a novel and improved device for cleaning the gas nozzle of a welding torch.

It is another object of the present invention to provide such a cleaning device which significantly decreases the time of cleaning a gas nozzle.

It is a further device of the present invention to provide such a gas nozzle cleaning device wherein the cutter is capable of spraying an anti-adhesive into the gas nozzle while the cutter is in the cleaning or scraping position.

The cleaning device of the present invention essentially comprises a body portion upon which is positioned a gas nozzle to be cleaned A rotatable cutter is axially movable into and out of the positioned gas nozzle to scrape weld splatter therefrom. The cutter is provided/with means including supply passages for spraying an anti-adhesive agent into the nozzle while the cutter is positioned in the gas nozzle to scrape/weld splatter therefrom.

According to one aspect of the present invention, the shank or base of the cutter is provided with ducts or passages for the supply of the anti-adhesive agent. With this construction, the anti-adhesive agent can be sprayed into the gas nozzle through the passages even during the cleaning or scraping process, but at the latest, when the cutter is being retracted from the nozzle. In addition to significantly saving time in the cleaning of each nozzle, the present invention produces a spray stream which sweeps along and flings away scraped-off welding residue. In addition, the anti-adhesive agent can also be used during the scraping process to lubricate and cool the cutter and the gas nozzle.

Figure 1:
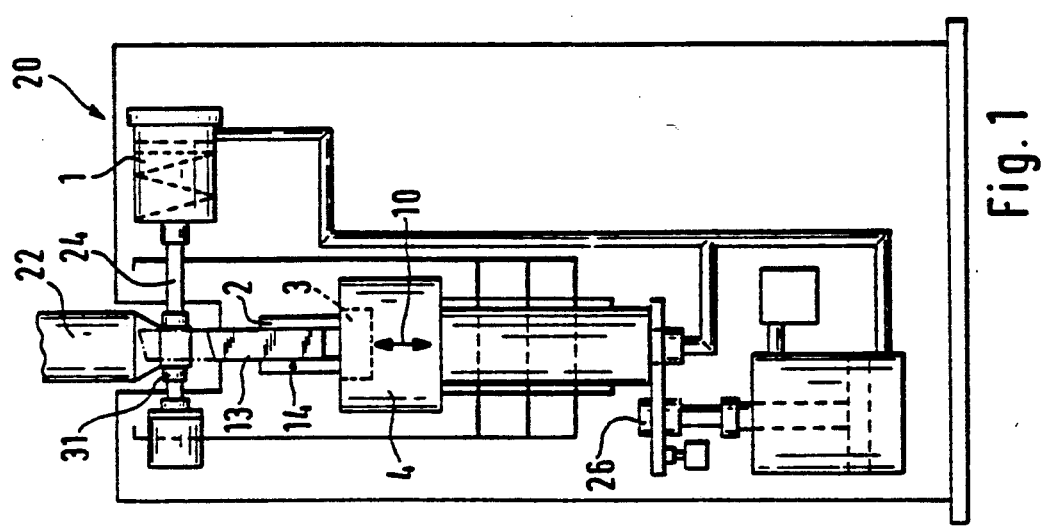

Other objects and advantages of the present invention will be apparent upon reference to the accompanying description when taken in conjunction with the following drawings, which are exemplary, wherein;

FIG. 1 is a diagramatic representation of the cleaning device according to the present invention in an elevational view; and FIG. 2 is a detailed and enlarged scale of a portion of FIG. 1 and partially in section to illustrate details of construction.

Proceeding next to the drawings wherein like reference symbols indicate the same parts throughout the various views, a specific embodiment and modifications of the present invention will be described in detail.

As may be seen in the drawings, nozzle (22) to be cleaned is introduced into and positioned on a cleaning device (20). An electromagnet (1) shoves a clamping part (24) against the nozzle, so that the nozzle is pressed against a stop (31) of the cleaning device, and occupies a stationary position in the device. An electric motor (4), which can be raised and lowered in the direction of arrow (10), is provided below the nozzle. A cutter base (3) is provided on the shaft of the electric motor for shank (2) of cutter (14). Cutter shank (2) carries two axially extending blades (13). For scraping, motor (4) is lifted by a lifting device (26) in the direction of arrow (10) and put in rotation. After the scraping, the motor with cutter (14) is lowered again.

Shank (2) of the cutter and base (3) for cutter (14), have axially extending ducts or passages (5 and 5a) each placed in the axis of rotation and connected end to end. Duct (5) is connected by a radial bore (8) in base (3) to an annular recess (7) in a stationary support part (15) of the cleaning device body (20). Annular recess (7) is connected by a duct (8) to a storage tank (9) for the nonsticking agent.

A compressed air device (19)—which presses the nonsticking agent through duct (8), annular recess (7), bore (6) and ducts (5, 5a) to a spray nozzle (11) of cutter shank (2), where it squirts out in a widening jet (12)—acts on storage tank (9) as shown.

Since blades (13) of the cutter are placed separately from one another, spray jet (12) can reach inner wall (16) of welding nozzle (22). As a result, the spraying with the nonsticking agent is possible even during the scraping of nozzle (22). At the same time, blades (13) and welding nozzle (22) are cooled and lubricated during the scraping. Further, the scraped-off residues of the welding material are washed away.

Thus it can be seen that the present invention provides an improved device for cleaning the gas nozzle of a welding torch in which the welding residue can be swept away during the scraping by the cutter of the welding residue from inside the nozzle. As a result, the elapsed time of cleaning such a gas nozzle is significantly decreased.

It will be understood that this invention is susceptible to modification in order to adapt it to different usages and conditions, and accordingly, it is desired to comprehend such modifications within this invention as may fall within the scope of the appended claims.

What is claimed is:

1. A device for cleaning the gas nozzle of a welding torch in which weld splatters have accumulated on the gas nozzle comprising a body, means on said body for positioning a gas nozzle to be cleaned, a rotatable cutter axially movable into and out of a said positioned gas nozzle to scrape weld splatter therefrom, and means on said cutter including a supply passage for an anti-adhesive agent and a means for spraying the anti-adhesive agent gas nozzle while said cutter is positioned in said gas nozzle and scraping weld splatter therefrom, said means for spraying comprises a spray nozzle connected to said supply passage, said cutter has a pair of axially extending cutter blades and said spray nozzle is directed toward said cutter blades to cool and lubricate said cutter blades and said gas nozzle.

2. A device as claimed in claim 1 wherein said cutter has a base and a rotational axis and said supply passage is disposed in said base at or near said rotational axis.

3. A device as claimed in claim 2 wherein said cutter further includes a shank and said supply passage is disposed in said shank.

4. A device as claimed in claim 2 wherein there is an annular recess on a stationary portion of said body rotatably receiving said cutter base, said base having a radial bore therein connecting said supply passage to said annular recess.

5. A device as claimed in claim 4 and further comprising means for connecting said annular recess to a supply of anti-adhesive agent.

6. A device as claimed in claim 5 and further comprising a source of fluid pressure connected to said supply of anti-adhesive agent to urge said agent into said annular recess and said supply passage.

* * * * *